United States Patent [19]

Wittman et al.

[11] 4,046,301
[45] Sept. 6, 1977

[54] PROCESS FOR EXPLOSIVELY JOINING TWO PIPE SECTIONS

[75] Inventors: Robert H. Wittman, Littleton; William G. Howell, Lakewood, both of Colo.

[73] Assignee: Exxon Research and Engineering Company, Linden, N.J.

[21] Appl. No.: 711,015

[22] Filed: Aug. 2, 1976

Related U.S. Application Data

[60] Division of Ser. No. 489,523, July 18, 1974, Pat. No. 3,987,952, which is a continuation-in-part of Ser. No. 252,641, May 12, 1972, abandoned.

[51] Int. Cl.² .............................................. B23K 21/00
[52] U.S. Cl. ...................................... 228/108; 228/109
[58] Field of Search ................ 228/107, 108, 109, 2.5; 29/421 E

[56] References Cited

U.S. PATENT DOCUMENTS

| | | | |
|---|---|---|---|
| 3,455,017 | 7/1969 | Zondag | 228/108 |
| 3,563,713 | 2/1971 | Rudd | 228/107 |
| 3,645,435 | 2/1972 | Doherty | 228/107 X |
| 3,720,069 | 3/1973 | Lockridge | 228/107 |
| 3,761,004 | 9/1973 | Hanson | 228/2.5 |

FOREIGN PATENT DOCUMENTS

| | | | |
|---|---|---|---|
| 615,993 | 3/1961 | Canada | 228/107 |
| 4,531,379 | 12/1970 | Japan | 228/107 |
| 766,741 | 1/1957 | United Kingdom | 228/2.5 |

Primary Examiner—Al Lawrence Smith
Assistant Examiner—Nicholas P. Godici
Attorney, Agent, or Firm—Salvatore J. Casamassima

[57] ABSTRACT

A metal sleeve having a substantially cylindrical outer surface and having first and second inner surfaces tapering outwardly longitudinally from at least adjacent the center thereof is formed to provide equal angles with abutting ends of two hollow cylindrical members such as pipe; the center inner surface of the sleeve is formed to contact abutting ends of the two hollow cylindrical members at least adjacent the ends thereof. The sleeve has a high explosive mass placed circumferentially thereon and is formed of a circumferential body having a greater thickness at least adjacent the center of the mass than at its ends such that on detonation maximum explosive impact is exerted inwardly toward said sleeve to weld the abutting ends together.

3 Claims, 17 Drawing Figures

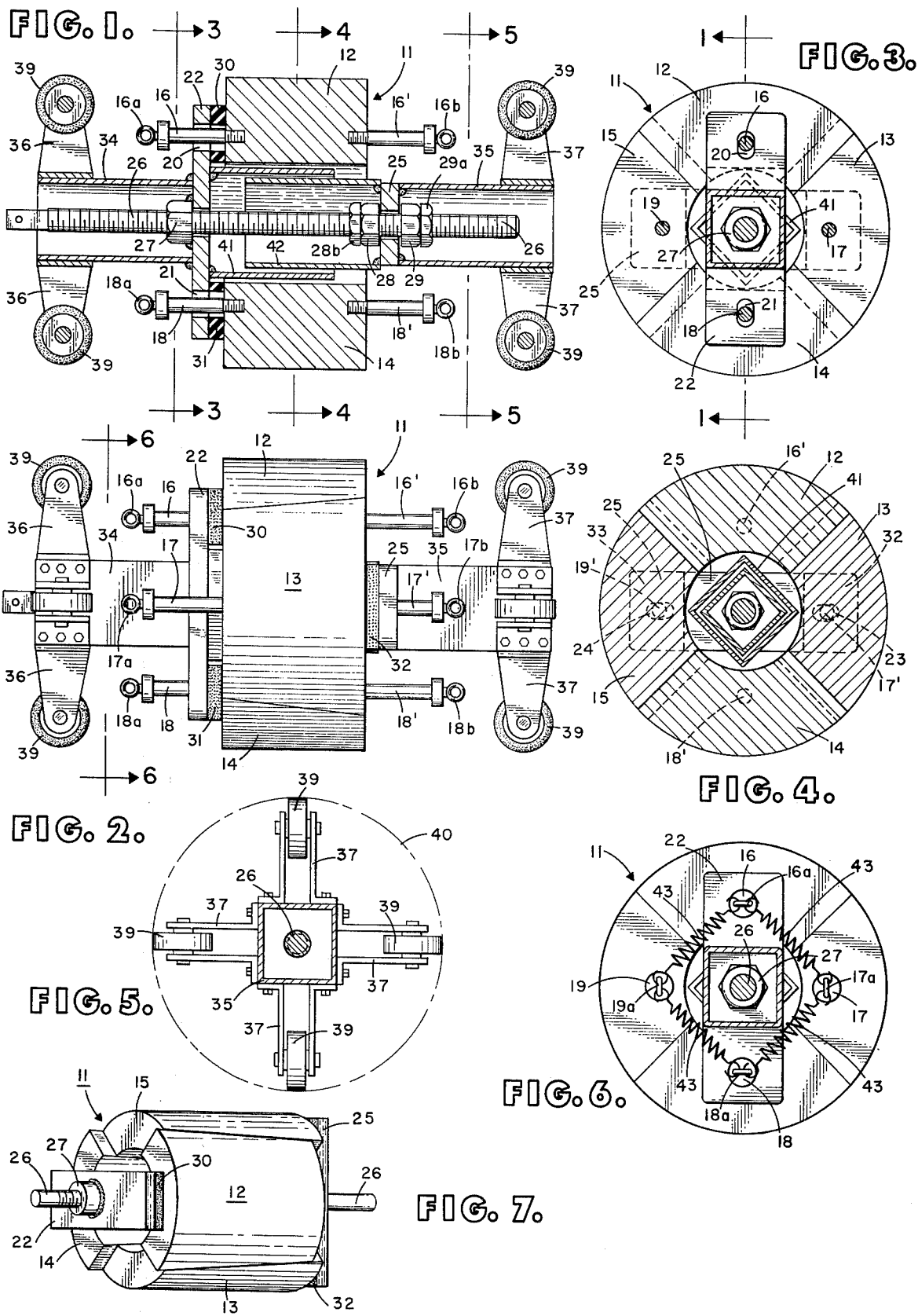

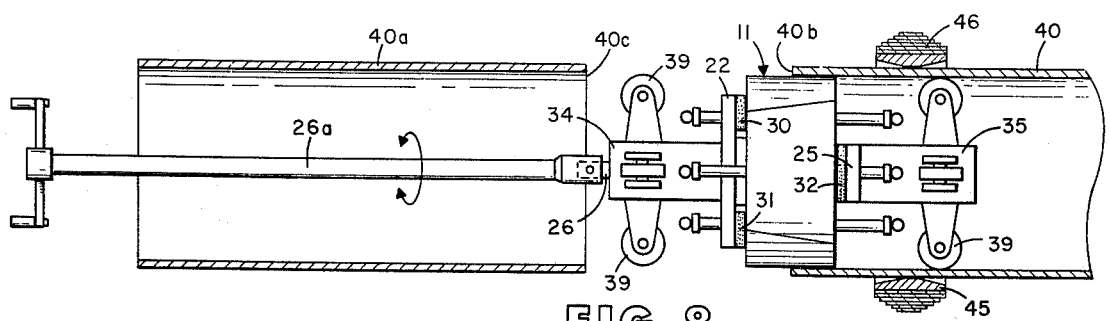
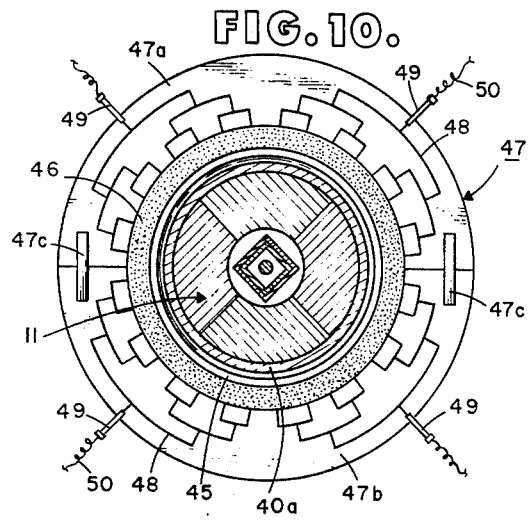
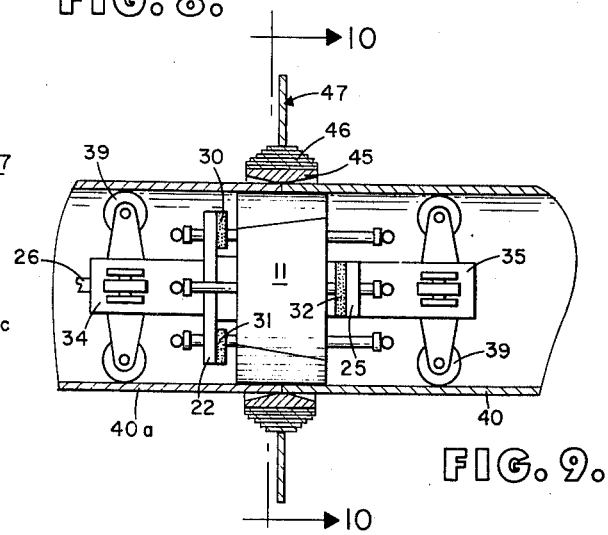
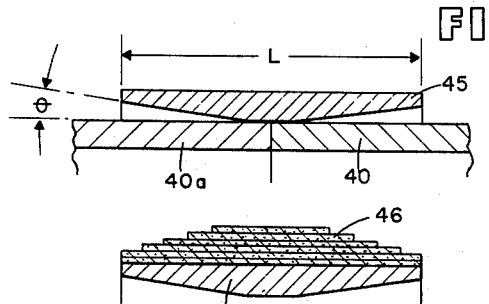
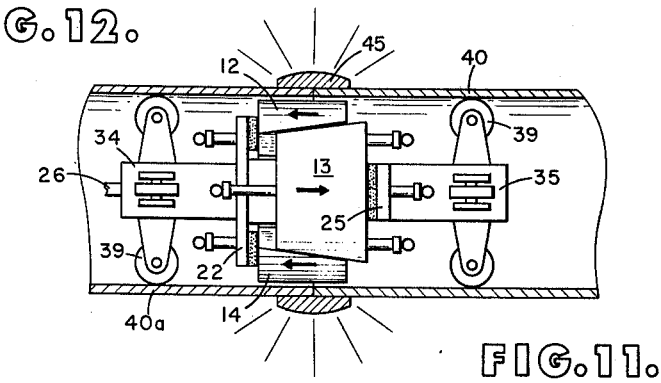
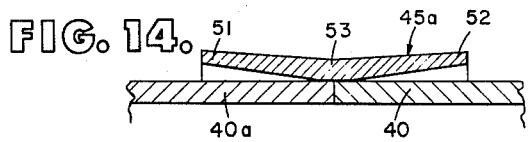
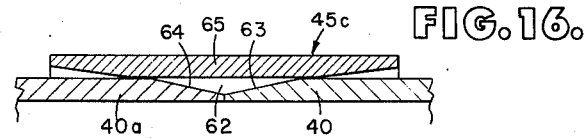
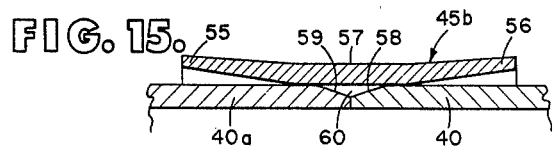
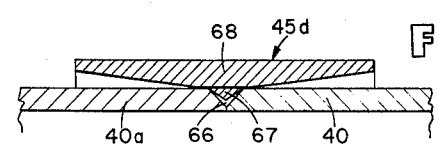

PROCESS FOR EXPLOSIVELY JOINING TWO PIPE SECTIONS

This is a divisional of application Ser. No. 489,523, filed July 18, 1974, which is a continuation-in-part of Ser. No. 252,641, filed May 12, 1972, now abandoned. Ser. No. 489,523 issued as U.S. Pat. No. 3,987,952 entitled "Apparatus for Explosive Welding of Hollow Cylinders Such as Pipe" and is incorporated herein by reference.

CROSS REFERENCE TO RELATED APPLICATIONS

This application is related to the following co-pending applications commonly assigned herewith:

1. Ser. No. 391,363 filed Aug. 24, 1973 in the name of William G. Howell and entitled "Explosive Welding Apparatus for Pipe," U.S. Pat. No. 3,825,165.
2. Ser. No. 252,821, filed May 12, 1972, in the names of William G. Howell, Theodore A. Espinoza and Robert H. Wittman, and entitled "Welding of Pipe by Use of Explosives," U.S. Pat. No. 3,806,020.
3. Ser. No. 252,678, filed May 12, 1972, in the names of William G. Howell, Steve H. Carpenter and Henry E. Otto, and entitled "Explosive Welding of Pipe with Explosive Means," U.S. Pat. No. 3,819,103.
4. Ser. No. 398,941, filed Sept. 20, 1973, in the names of William G. Howell, Robert H. Wittman and Theodore A. Espinoza and entitled "Dual High Explosive Shape Detonation," U.S. Pat. No. 3,910,478.

BACKGROUND OF THE INVENTION

1. Field of the Invention

The present invention is directed to explosive welding of pipe. More particularly, the invention is concerned with a collar or sleeve with a formed explosive for explosive welding of hollow cylinders such as pipe. In its more specific aspects, the invention is directed to apparatus for explosive pipe welding in which a formed explosive mass and a collar of particular shapes are employed in explosive welding of two hollow cylinders or sections of pipe together.

2. Description of the Prior Art

Welding of sections of pipe together by the action of explosives is well known. It has also been taught to use interiorly arranged mandrels in welding of pipe to prevent collapse thereof. The prior art also teaches the use of pipe collars for welding pipe by explosive action. Such collars have been formed to provide an angle with the exterior of the pipe but the collars are usually of the same thickness throughout and so is the explosive employed. Likewise, high explosives have been arranged on the exterior of the collar as a cord which is detonated. None of the prior art, however, teaches or makes obvious the present invention wherein an expandable and compressible mandrel is employed which is easily movable through the pipe after weldment of one section to another.

Moreover, the prior art does not teach the use of such a mandrel with a particular type of collar and arrangement of explosive or use of the mandrel, collar, and a particular form of explosive.

Prior art considered by applicant in preparing this application with respect to this invention includes the following patents:

| U.S. Pat. | | | |
|---|---|---|---|
| 3,111,327 | 3,290,771 | 3,264,731 | 2,367,206 |
| 3,137,937 | 3,535,767 | 402,107 | 2,909,951 |
| 3,263,324 | 3,563,713 | 1,240,326 | 3,197,855 |
| 3,343,248 | 1,770,649 | 1,642,825 | 3,308,532 |
| 3,434,194 | 2,167,896 | 1,878,725 | 3,313,021 |
| 2,779,279 | 3,570,109 | 1,937,644 | 3,455,017 |
| 3,290,770 | 3,263,323 | 3,055,095 | 3,434,197 |
| | Belgian Patent 655,943 | | |

SUMMARY OF THE INVENTION

The present invention may be briefly described and summarized as involving a collar circumferentially embracing abutting ends of pipe at least adjacent to the center of the collar. A hollow expandable mandrel is useful in explosive welding of the pipe sections together. In the present invention, a hollow mandrel is placed within the abutting pipe sections under the collar. The ends of the pipe may be buffed to clean metal. The collar is interiorily formed to have a tapered shape such that the ends thereof are of a lesser thickness than the center. The outer surface of the collar is substantially cylindrical and on it is placed a formed mass of high explosive which covers the collar and which is layered, stepped, molded, or mounded, cast, or formed in any shape such that the thickness of the high explosive mass is greater at the center thereof than at its outer periphery. Arranged in explosive contact with the high explosive is a high explosive pattern of explosive mounted on a suitable planar surface which may be and preferably is destructive by the explosive. The high explosive mass on the collar is contacted at a plurality of points on the periphery of the explosive mass by separated or buffered strips of high explosive arranged on the planar surface leading to detonation means connected to a source of electrical energy such that on detonation of the ring or mass the collar is substantially instantaneously driven at a sufficient force against the abutting ends of the pipe sections to weld the inner surface of the collar thereto and weld the sections together; the force of the explosive causes the hollow mandrel segments to move from an expanded position such that it is of a lesser diameter and may be moved in the pipe to the next section to be welded onto the ever-increasing length of pipe line being formed.

VARIABLES OF THE INVENTION

The mandrel is suitably formed of at least two pairs of opposing tapered pipe sections. While four sections are preferred and most desirable for 10-14 inch pipe and the like, a greater number of opposing pairs of segments may be used for larger pipe. Likewise, a plate on each end may be used with four segments; a greater even number of pairs of segments may require a greater number of plates to cause the tapered segments to be compressed into a cylindrical shape and expand against the inner surface of the pipe sections to be welded together. Four, six, eight, or a greater number of segments may be used with a plate on one end for each pair of segments. The plates are suitably angularly disposed relative to each other and for two pairs of segments may be arranged 90° with respect to each other. The angles for a greater number of pairs will depend on the number of pairs and generally will be less than 90° relative to each other.

The high explosive used in the mass on the collar and in the pattern may be any one of a number of high explosives such as, but not limited to, Detasheet C which is 63% by weight PETN, 7% by weight nitrocellulose and 30% polymeric materials and has a specific gravity of 1.48, a detonation velocity of about 23,000 feet per second, and is currently supplied on the market in rubbery sheet form, pentaerythritol tetranitrate (PETN) with red lead and a binder composed of a mixture of butyl rubber and polymers of β-pinene, TNT, cyclomethylene (RDX), Pentolite which is a 50:50 mixture of TNT and PETN, amatol, a 50:50 mixture of ammonium nitrate and TNT, and other wellknown high explosives and mixtures thereof which may be shaped or formed on the collar as will be described more fully hereinafter.

Explosives should be selected having detonation velocities within the range from about 15,000 to about 30,000 feet per second. Generally, explosives having detonation velocities within the range from about 23,000 to about 30,000 feet per second may be used in the pattern and explosives having detonation velocities within the range from about 15,000 to 23,000 feet per second in the mass or ring. However, explosives having detonation velocities within the range of about 15,000 to about 30,000 feet per second may be used in both.

The high explosives shaped or formed or otherwise placed on the collar such as by casting may have a thickness at least adjacent its center about 200% to about 100% of the thickness of the sleeve or collar at least adjacent its center and a thickness adjacent its ends about 200% to about 100% of the collar at least adjacent the ends of the collar. The high explosive may be shaped, formed, cast, or molded, to be layered, stepped, triangular, conical, truncated conical, or mounded in cross-section.

The planar surface may be formed of plywood and the like, or of a suitable plastic material, or other destructible material of light weight. The surface may be circular with a concentric circular opening therethrough conforming to the outer circumference of the high explosive on the pipe collar and may be made of two or more sections which are easily connectible together with a fastener means which simply may be adhesive tape or latches, and the like.

The size of the pipe which may be welded may vary from about 2 to about 48 inches in diameter with collars corresponding in size to weld the ends of the pipe together, but larger diameters of pipe may be used.

The initiation system for the explosive welding provides fo multiple point initiation of the explosive charge in a plane directly over the abutting pipe ends. The actual number of points of initiation employed will depend on the diameter of pipe being joined; however, we have found that the final spacing between points of initiation should not be greater than 2 inches.

The amount of high explosive to be employed will vary, of course, with the size of the pipe collar and the detonation velocity of the explosive. However, the high explosive ring on the collar may have a thickness at the center of the collar sufficient to provide from about 4 to about 32 grams per square inch down to a thickness of from about 2 to about 16 grams per square inch at the ends or edges of the collar. For example, in welding nominal 12 inches pipe and employing Detasheet C explosive, the explosive would have a thickness at the center of the collar of about 10 to about 12 grams per square inch and at the ends or edges of the collar from about 4 to about 6 grams per square inch.

The collar may have a thickness at the center substantially the same or slightly larger than the wall thicness of the pipe sections tapering on its inner surface to about one-half the pipe section's wall thickness.

The center inner surface of the collar or sleeve may be from about 1/16 inch to about 1 inch in width, while the inner tapered surfaces may each be from about 45% to about 48% of the length of the collar. For example, a 12-inch pipe may require a collar about 4 inches in length while a 48 inch pipe may require a collar of about 4 to about 6 inches in length. A nominal 2 inch pipe may require a collar of about 2 inches length, whereas pipe of nominal 20 inches diameter may require a nominal 4 inch length collar.

BRIEF DESCRIPTION OF THE DRAWING

The present invention will be further described and illustrated by reference to the drawing in which:

FIG. 1 is a sectional view of the mandrel taken along the line 1—1 of FIG. 3;

FIG. 2 is a side elevational view of the mandrel;

FIG. 3 is a front view of the mandrel taken along the lines 3—3 of FIG. 1;

FIG. 4 is a view of the mandrel taken along the lines 4—4 of FIG. 1;

FIG. 5 is a view of the mandrel taken along the lines 5—5 of FIG. 1;

FIG. 6 is a view showing the arrangement taken along the lines 6—6 of FIG. 1 of the tension members not shown in FIG. 1;

FIG. 7 illustrates a mandrel in non-compressed position apart from other appurtenances;

FIG. 8 is a view showing positioning of the mandrel in pipe sections to be welded;

FIG. 9 is a view illustrating the pipe sections of FIG. 8 in position to be welded;

FIG. 10 is a view taken along lines 10—10 of FIG. 9;

FIG. 11 shows the welded pipe sections of FIGS. 8 and 9;

FIG. 12 illustrates the pipe collar of FIGS. 9, 10, and 11 before explosive welding;

FIG. 13 illustrates an enlarged view of the pipe collar and explosive of FIGS. 9 and 10;

FIG. 14 is a partial sectional view in crosssection of a modified pipe collar having a substantially cylindrical outer surface;

FIG. 15 is a partial sectional view of another modified pipe collar having a substantially cylindrical outer surface;

FIG. 16 is a partial sectional view of still another pipe collar with tapered ends of pipe; and FIG. 17 is a partial sectional view of a further modification of pipe ends formed to provide a notch having a ring in the notch with a collar such as FIG. 13.

DESCRIPTION OF THE PREFERRED EMBODIMENTS

Referring now to the drawing and particular to FIGS. 1 to 7, numeral 11 designates the pipe mandrel formed of tapered hollow segments 12, 13, 14 and 15. The taper of the segments may be at an angle from about 1°–30°, but preferably is at an angle of about 7°–8° with the longitudinal axis. Connected to each end of segments 12, 13, 14 and 15 are longitudinal members 16, 16′, 17, 17′, 18, 18′, 19 and 19′, each provided with an eye means 16a, 16b, 17a, 17b, 18a, 18b, 19a, and 19b, respectively.

Rod members 16 and 16' connect to opposite ends of segment 12 and likwise members 18 and 18' connect to segment 14. Rod members 17 and 17' connect to opposite ends of segment 13 and likewise rod members 19 and 9' connect to segment 15. Rod members 16 and 18 extend through openings 20 and 21 in plate 22, and rod members 17' and 19' extend through openings 23 and 24 in plate 25. The other rod members 17, 19, 16' and 18' are provided for use as will be described.

Passing through central openings in plates 22 and 25 is a threaded longitudinally axially extending rotatable rod member 26 which threadedly engages a nut 27 welded to plate 22. Positioned on rod 26 on opposite sides of plate 25 are nuts 28 and 29, locked in place by lock nuts 28a and 29a, whereby the nuts will rotate with rod 26 and cause longitudinal movement of plate 25. The nuts 28 and 29 also allow adjustment of the plates relative to each other.

The plates 22 and 25 are spaced from their respective segments and this space is provided with resilient pad means 30 and 31 and 32 and 33, the latter of which is shown in dotted lines in FIG. 4. The resilient means may be rubber, springs or other compressible means. It will be seen that plate 22 with pads 30 and 31 operably engage one end of each of the segments 12 an 14, while plate 25 with pads 32 and 33 operably engage one end of each of the segments 13 and 15. The plates 22 and 25 are positioned on rod 26.

Connected to each plate 22 and 25 are members 34 and 35, respectively, on each end of which are yoke members 36 and 37 (FIGS. 1, 2 and 5) in the shape of a cross and formed to carry on theiir ends rollers or wheels 39 for movement of the mandrel 11 through a pipe section such as 40 shown in dotted line in FIG. 5.

Referring to FIGS. 1 and 4, telescoping members 41 and 42 are connected respectively to plates 22 and 25 and serve to provide stability for the segments 12, 13, 14 and 15, especially when large mandrels are used with large sizes of pipe. It will be noted that the members 41 and 42 are square shaped in cross section and member 42 telescopes within member 41. This provides a spline assembly which extends through the central opening formed by the segments and allows longitudinal movement of the members 34 and 35 relative to each other. It will also be noted that the end of all the rod members 16-19' are provided with enlarged heads to prevent excess longitudinal retraction of the segments relative to each other.

In FIG. 6, tension means 42, not shown heretofore for reasons of clarity are connected to eye means 16a, 17a, 18a, and 19a and, of course, while not shown in this view similar tension means 43 are connected to eyes 16b, 17b, 18b, and 19b. These tension means 43 are provided to maintain and hold the segments 12, 13, 14 and 15 together, especially in their retraced positions. The spring members 43 tend to bias the segments toward the center axis of the assembly whereby they do not drag or contact the inside wall of the pipe when retracted.

FIG. 7 shows the mandrel 11 in its relaxed or nonexpanded position with the segments 13 and 15 moved relative to segments 12 and 14. FIGS. 1 to 4 and 6 show the segments 12-15 in their expanded and locked position.

Referring now to FIGS. 8-13 inclusive, the mandrel 11 is in the pipe section 40 and a metal collar 45 (FIG. 12) with a layered stack 46 of high explosive such as Datasheet C arranged thereon. It will be noted that the collar 45 is tapered interiorly its ends while the layered stack 46 has its greatest thickness corresponding to the greater thickness of the collar 45. The collar 45 defines angles of about 1° to 30° with the exterior of the pipe sections 40 and 40a with a preferred angle being about 8° with a detonation velocity of the explosive of approximately 23,000 feet per second. As a general rule, the greater the detonation velocity of the high explosive, the greater should be the angles. However, the angles, amount of high explosive and detonation velocity are all important. A suitable angle is about 5° to about 15°.

The use of the selected angle is necessary and important because of the necessity to establish necessary impact conditions in the shortest time and therefore the shortest distance possible from the collar to the abutted pipe ends. For example, parallel geometry for the collar and pipe takes a longer time and require a greater distance from the collar to the pipe which the present invention avoids. Tapering the collar or sleeve also requires a lesser amount of explosive to propel the collar or sleeve. This allows reduction of the explosive layer or mass (ring) thickness. The total amount of explosive is reduced with numerous benefits both from an economic and safety standpoint. Thus, the configuration and material of the collar employed, which is preferably made of steel, is of primary importance in obtaining a good weld. As illustrated and disclosed herein, the collar has an inside diameter comprising a double taper from a central plane as shown in FIG. 12. As shown, the outer edges of the collar cross-section are thinner than at its center which is substantially equal to the wall thickness of the pipe. With the collar so positioned for welding, the relatively thick center is located directly over the butt line of the two pipes, with each taper forming an angle with the underlying pipe surface. When the explosive is detonated the tapers of the collar close the anle between themselves and their respective underlying pipe surface. This is done with such a force that a metallurgical bond is formed between the collar and each pipe. After the weld is completed, the collar has a cross-sectional thickness at the mid-plane of its width equal to or greater than the wall thickness of the pipe and tapering to some lessor thickness at the collar ends. Because the cross-sectional area of the collar at the mid-plane of its width is equal to or greater than the cross-sectional area of the abutted pipe ends, the joint has an axial load carrying capacity equal to or greater than the pipe, assuming pipe and collar are of equal tensile strength. From the center plane, however, the load between the collar and the pipe is carried as a distributed shear load which diminishes to zero somewhere near the ends of the collar. Thus, this makes it practical for the collar thickness to diminish from the center to its ends as disclosed herein. In summary then, the tapered collar is advantageous because the angle stand off makes it technically feasible to employ explosives which have detonation velocities greater than the sonic velocity of steel, whereas a low detonation velocity explosive would be required for a parallel geometry collar. Since explosives having a high detonation velocity deliver their characteristically high impulse in a shorter time than a low velocity explosive, this means that the acceleration to maximum velocity is greater for the tapered collar driven by high detonation velocity explosive. When the acceleration of the collar to the required velocity is high, this permits reduction of the width of the collar because lead-in non-bond is minimized. Finally, minimizing the collar width reduces the collar weight and the total amount of explosive necessary for welding, both of which contribute substantially to the economics of the present invention.

The ends 40b and 40c of the pipe sections 40 and 40a, respectively, are buffed to clean metal for about 2 inches from each of the ends and the ends butted together as shown in FIG. 9. The mandrel 11 is then centrally located thereunder with the segments thereof in their retracted position. When it is determined that the pipe sections are accurately aligned and the ends thereof in full abutment, the rod member 26 is rotated by crank rod 26a in one direction to draw the plates 22 and 25 toward each other, thereby expanding the tapered segments 12-15 against the inner wall of each of the pipe sections. At this time the collar 45 with explosive ring 46 is moved on the pipe to the position shown in FIG. 9. After the collar is properly postioned, the rod 26 is rotated in the opposite direction to move the plates 22 and 25 away from the segments a prescribed distance as shown in FIG. 9. The segments will maintain their expanded position against the inner wall of the pipes by means of the locking effect of the taper of the segments, and are in full 360° contact with the pipe wall. This complete contact prevents occurrences of deformitis during the explosive welding process.

The initiation system for the present explosive welding process invention provides for multiple point initiation of the explosive charge in a plane directly over the abutting pipe ends. This is accomplished by employing an explosive "logic" system, i.e., where the initial detonation front (e.g., a ribbon of Detasheet) is divided and these two fronts are in turn divided, etc., until the desired number of detonation points is obtained. For example, in the case of a 12-inch diameter pipe, eight points of initiation in a single quadrant were found satisfactory, or in other words 32 equally-spaced initiation points in all where a Detasheet was employed as the main charge. As illustrated and discussed in greater detail hereinafter, the starting point in each quadrant is initiated by a primadet and each of the four primadet leads is initiated by an electric detonator. For example, in the case of a five inch pipe by comparison to the twelve inch pipe, only eight points of initiation and two detonators were used. The most important parameter in this initiation system is the distance between the points of initiation, which for satisfactory operation should be no greater than two inches at their final spacing adjacent the explosive ring. The reasoning for this spacing requires that one consider the development of detonation fronts emanating from two points in the main charge, with each point of the initiation causing a circular detonation front to develop which increases in radius as it approaches the adjacent initiation point. These detonation fronts collide on a line substantially halfway between initiation points, at which the pressure doubles when the collision takes place. If the radius of the two circular fronts is small then the collision is progressive from the central plane to the edge of the collar. However, if the radius is relatively large, then the detonation front approaches a straight line and the collision occurs essentially simultaneously across the full width of the collar. A strong compressive shock wave, having both radial and tangential components, progresses in the steel immediately under the detonation fronts. At the collision line of the shock waves the stress doubles, thereby creating a plastic shear zone. Release waves which follow due to rapidly decreasing pressure result in tensile stress waves that reflect in the previously established shear zone. If such a reflection is allowed to occur simultaneously across a relatively broad front, a tensile failure is often the result. It has been found that the multiple point initiation system of the present invention functions quite satisfactorily when correctly applied with appropriate spacing between points of final initiation.

Thereafter the planar surface 47 with the arrangement of Detasheet C strips 48 on planar surface 47 and detonators 49 are connected to a source of electrical energy not shown by leads 50 and strips 48 are placed on explosive contact with the layered mass 46, as shown in FIGS. 9 and 10, the two sections 47a and 47b being held together by connecting means 47c. The detonators 49 are simultaneously electrically energized and the high explosive mass 46 detonates and causes the collar 45 to be forced against pipe sections 40 and 40a with sufficient impact to cause the sections 40 and 40a to be welded together as shown in FIG. 11 by welding the collar 45 to the sections 40 and 40a. It will be noted from FIG. 11 that the force of the collar 45 against the pipe sections 40 and 40a and mandrel 11 causes the segments 13 and 15 to move relative to segments 12 and 14 diminishing the circumference of the mandrel 11 to its retracted position (FIGS. 6 and 11) and allowing it to be moved to the open end of pipe section 40a for explosive weldment of another pipe section thereon.

Referring now to FIG. 14, it will be seen that the metal collar 45a on the pipe sections 40 and 40a is thicker at the center 53 than at its end 51 and 52 and has a slight upward curvature toward both ends 51 and 52 although its outer surface is substantially cylindrical.

FIG. 15 is similar to FIG. 14 in having an upward curvature in the collar 45b towards the ends 55 and 56 but also having its outer surface substantially cylindrical but has a greater portion of the same greater thicknes than the ends 55 and 56 at the center 57 which bridges the space 60 formed by the tapered ends 58 and 59 of pipe ends 40 and 40a, respectively, to form a relatively broad V-shaped notch or space 60.

FIG. 16 is similar to FIGS. 13 and 15 but omits the upward curvature of FIG. 15. In FIG. 16 the collar 45c likewise bridges a relatively wider space 62 formed by the tapered ends 63 and 64 of the pipe sections 40 and 40a. In FIG. 16, the center portion 65 is wider than the center portion 57 of FIG. 15 corresponding to the relatively wider space 62 formed by the tapered ends 63 and 64 of the pipe sections 40 and 40a of this figure.

In FIG. 17, which is similar to FIGS. 13 and 16, a narrow V-shaped notch or space 66 is formed by the pipe ends of the pipe sections 40 and 40a, respectively, into which is placed a metal or sealant rings 67 which is preferably triangular in cross section but which may be any crosssectional shape. The ring 67 may be suitably constructed of other materials than metal which resists high temperatures and forces. The collar 45c is similar to the collar 45 in FIG. 13 and bridges the space 66. The collar 45a is thicker at its center 68 than at its ends, and its inner surface is tapered outwardly while its outer surface is cylindrical. In this respect, it is also similar to collar 45c where the inner surface of the collar 45a tapers outwardly at its ends and while the outer surface of the collar 45c of FIG. 16 is also cylindrical. While two embodiments illustrate collars with slight upward curvature, the external surface is still substantially cylindrical, the figures illustrating the collars being exaggerated for clarity.

The various shapes of the collars shown in the several figures of the drawing may be used in welding metal pipe sections such as 40 and 40a together, but the collar 45 of FIG. 13 is to be preferred. Where the pipe is tapered to form a notch, a metal ring may be used to fill same, but ordinarily it is preferred to have the pipe ends butt squarely with no taper, although pipe with inward tapers on the outer surface at its end may be used. The space or notch formed by tapered pipe ends between the pipe ends may result in a smooth welded collar and may avoid the formation of an outward slight bulge to the welded collar as shown exaggerated in FIG. 11. This slight bulge, if any, has no effect on the strength or integrity of the welded pipe and may be hardly noticeable.

Thus, the present invention is quite important and useful. Pipe sections may be welded together with a minimum expenditure of equipment, effort and time. Pipe sections of 12-inches in diameter and of greater or lesser diameter are easily welded together. The invention is, therefore, new, useful and unobvious since heretofore manpower and/or machines were necessary to weld pipe together.

The nature and objects of the present invention having been clearly described and illustrated and the best mode and embodiment contemplated set forth, what we wish to claim as new and useful and secure by Letters Patent is:

What is claimed is:

1. A process for explosively joining two pipe sections arranged in end-to-end abutting relationship comprising:

positioning around the joint of said abutting pipe section a metal collar having a central portion and end portions which taper radially outwardly from said center portion to their respective outer ends, the outer surface of said collar being substantially cylindrical such that said center portion is the thickest portion of said collar;

placing around said collar a ring of high explosive which is shaped to have a greater radial thickness adjacent the central portion than adjacent the end portions of said collar, said high explosive having a detonation velocity of between about 15,000 and 30,000 feet per second; and simultaneously detonating said explosive at a plurality of locations which are radially aligned with the joint of said abutting pipe sections and which are circumferentially spaced about said ring.

2. The process of claim 1 which includes the step of expanding a cylindrical mandrel within said pipe to align and hold the abutting sections of said pipe.

3. The process of claim 1 wherein said detonation radially collapses said collar first in the plane of the abutting sections of pipe and subsequently in the axial direction.

* * * * *